March 30, 1926.
F. W. CHIPMAN
DISTRIBUTING TANK FOR OIL
1,579,193
Filed May 29, 1924
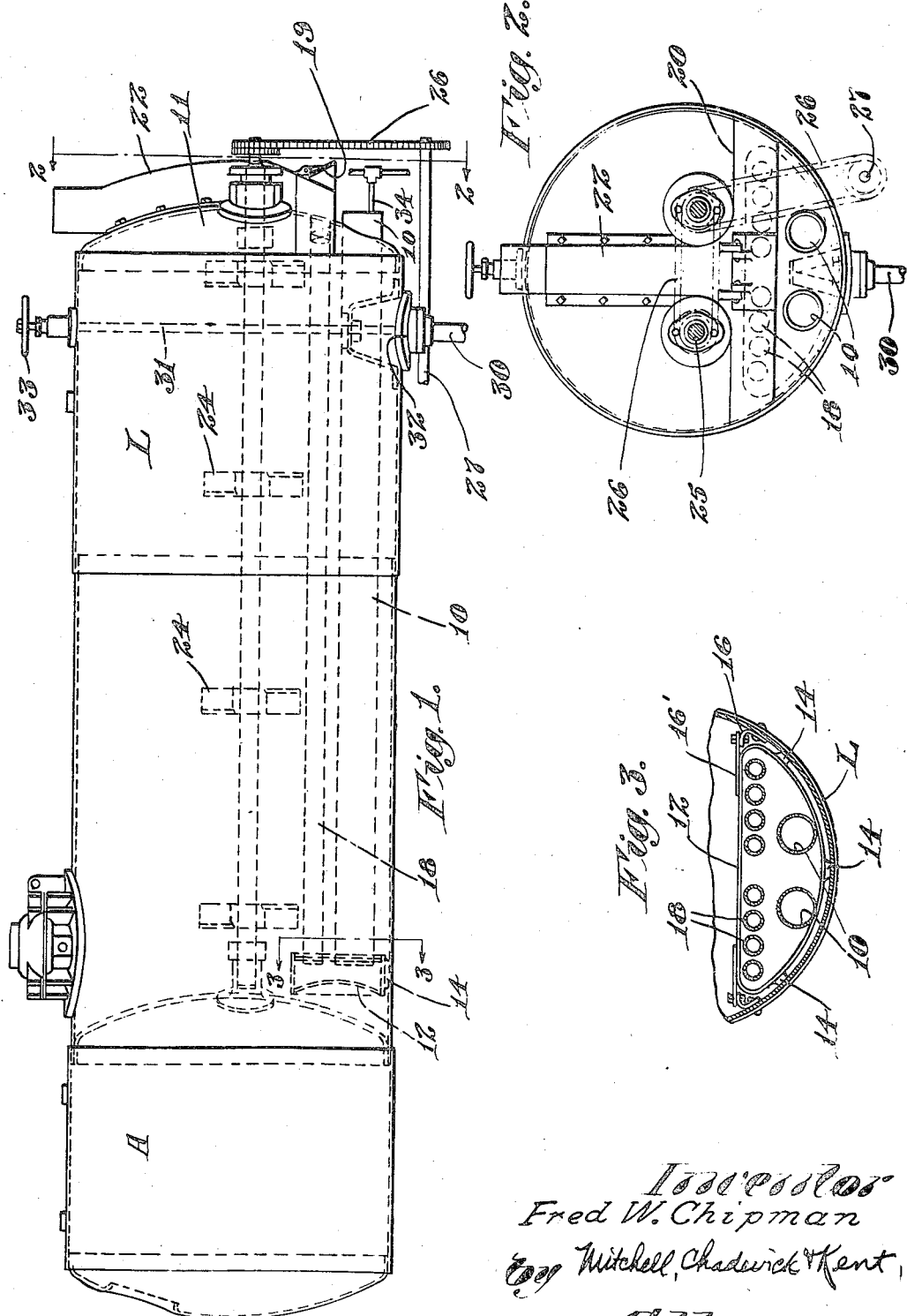
Inventor
Fred W. Chipman
By Mitchell, Chadwick & Kent,
Attorneys Patented Mar. 30, 1926.

1,579,193

UNITED STATES PATENT OFFICE.

FRED W. CHIPMAN, OF FRAMINGHAM, MASSACHUSETTS, ASSIGNOR TO INTERNATIONAL ENGINEERING WORKS, INC., OF FRAMINGHAM, MASSACHUSETTS, A CORPORATION OF MASSACHUSETTS.

DISTRIBUTING TANK FOR OIL.

Application filed May 29, 1924. Serial No. 716,778.

*To all whom it may concern:*

Be it known that I, FRED W. CHIPMAN, a citizen of the United States, residing at 219 Warren Road, Framingham, in the county of Middlesex and State of Massachusetts, have invented certain new and useful Improvements in Distributing Tanks for Oil, of which the following is a specification.

This invention relates to improvements in distributing tanks for oil.

More particularly it relates to portable tanks adapted to carry, heat and distribute oil, asphalt, gas tar products or the like in connection with the construction, and repair of roads. However, it may also be used with stationary tanks. The invention particularly applies to cases where a liquid is used which at atmospheric temperature is not sufficiently fluid to flow freely from the tank, even under considerable air pressure, so that it is necessary to heat the liquid and to distribute it under air pressure while heated. The present invention provides improved apparatus for this purpose.

It is desirable to carry a large supply of the liquid; but the capacity of a vehicle is restricted by the necessity of providing also a tank for air under pressure to expel the liquid, and by carrying a heater for the liquid in addition to other incidental apparatus. And inasmuch as a tank of a thousand gallons capacity requires dimensions of approximately four feet by twelve, which is close to the practicable limit for road vehicles of this sort, to which must be added nearly one third as much space for the air tank, it is an object of the invention to provide the necessary heating equipment in a minimum of space and with a maximum of efficiency. To this end the heating apparatus is arranged within the confines of the tank, with the burner near one end, and with conduits leading therefrom through the liquid providing flues for the products of combustion, the high temperature surfaces of the ducts being in direct contact with the liquid. It is a further object of the invention to provide for the expansion and contraction of the high temperature subdivision of the apparatus, so that its changes in dimensions will not introduce stresses into the tank or impair the security of the whole.

Apparatus to which the invention is applicable may be assumed to be a horizontal cylindrical tank mounted on an automobile truck and having a forward compartment for compressed air occupying approximately one-fourth of its space, and a rear compartment for the liquid such as asphalt. For the purposes of the invention there is provided within the latter compartment, at its forward end, a header, herein called a combustion chamber, made roughly in the shape of a segment of the circle of the tank at its bottom, with openings in its rear face at two levels. In the instance illustrated there are at the lower level two large openings, for receiving two stiff six inch tubes which come to it horizontally from the rear end of the tank and bring to it the flames from oil burners set within each of these tubes, herein called "combustion tubes". At the upper level the pipe openings are smaller and more numerous. For example, there may be eight openings of three inch size, from which eight tubes herein called "flue tubes" lead horizontally back to the rear of the tank where they communicate with a vertical stack, attached exteriorly to the tank so that to a degree the side of the stack heats the end wall. Thus there are provided two combustion tubes terminating in a header where combustion may be completed, in all of which there is relatively large volume of contents as compared with wall or radiating area. In this portion are the flame and the hotter gases; and from this the somewhat cooler gases pass out through flue tubes having greater radiating area relative to their individual volume. All of the tubes and the header become highly heated, and in consequence have material expansion as compared with the remainder of the tank which is at the temperature of the liquid. It is a further feature of the invention that the header is adapted to slide to and fro longitudinally of the tank on whose bottom it rests and to which it is confined by guides. The large and small tubes are secured to the rear end of the tank by suitable means, and this fastening of the rear end of the tubes constitutes the sole fastening of the tubes and header except as the latter is held centered by gravity and is confined within guides.

In consequence a high temperature can be maintained within all of the tubes, including a flame in the larger tubes and combustion chamber, thereby imparting heat to the liquid at great efficiency, both for fuel and for transmission of heat. The portion of the tank end forming a wall of the exhaust stack also provides additional surface radiating heat to the liquid, while the stack itself can expand freely backward from this rear wall as do the combustion tubes and chamber forward therefrom.

It is intended that the patent shall cover, by suitable expression in the appended claims, whatever features of patentable novelty exist in the invention disclosed.

In the accompanying drawings:

Figure 1 is a side elevation of apparatus embodying the invention, apart from its pipe connections and the truck upon which it may be assumed to be mounted;

Figure 2 is a rear elevation of the same in section on the line 2—2 of Fig. 1; and Figure 3 is a rear elevation of a detail, in section through the combustion tubes, flue tubes and adjacent portion of the tank, on line 3—3 of Figure 1.

Referring to the drawings, the tank is made with a forward compartment A for storage of compressed air, (the details for use of which are not shown) and with remainder L for storage of the liquid to be distributed, as, for example, asphalt. Relatively large combustion tubes 10 secured to and open through the rear end or head 11 of the latter compartment, extend horizontally forward wihin and along the bottom of the tank to a header or combustion chamber 12 within and near the front of the compartment. This header is preferably made with a bottom curved parallel with the wall of the tank, and with a flat top, and is supported slightly away from the bottom of the tank by suitable feet 14 which rest on and are slidable along the tank's inner surface. This header is thus fully movable longitudinally of the tank; is meanwhile maintained centered in the bottom of the tank by gravity; and any lifting or lateral movement is prevented by guides 16 (Fig. 3) secured to the sides of the tank, which guides have arms 16' that overlie the top of the header. The large tubes enter the lower portion of the rear face of the header; and from the upper portion of this same face a number of relatively small tubes 18 extend rearward. These are secured to the end wall of the tank, with their passages leading through that wall into the horizontal portion 20 of an inverted-T-shaped stack 22, which is attached to the exterior of the rear head of the tank, the wall of the latter serving as a wall of the stack.

Suitable oil burners within the combustion tubes 10 are fed by pipes 34 and the flames from these burners extend through the tubes 10 and may reach the combustion chamber 12. In the latter the unused air which has entered through any of the tubes 10 mixes with any unburned fuel gases that may have not completed burning in their own tube, and thus all air becomes available in the end to make the combustion complete for all of the fuel which has issued from any of the burners; and then the hot products of combustion flow backward through the upper layer, smaller tubes 18, into the stack and thence rise for escape into the atmosphere. Opposite the ends of the upper tubes, in the horizontal part of the stack, there may be a hinged door 19, shown as a small, gravity closed lid, called an explosion door. The illustrated position, opposite the ends of two of the tubes 18, shows how it can also be used for convenient access to them for cleaning. The forward portions of the tubes become very hot and the tubes consequently elongate considerably, while the tank walls remain relatively much less heated; but the differential in expansion produces no appreciable stresses in the tank. This is due to the fact that the tubes are not secured to the tank except at one end,—being at that end where the tubes are least hot,—while their other ends, together with the header, may move freely along the tank bottom. Thus the heating apparatus adds no requirement for greater strength than in an ordinary storage tank.

The liquid is in direct contact with the hot tubes and header, so that the transfer of heat is very rapid. Circulation of the liquid may be aided by an agitator 24, shown as stirrers set in the midst of the tank on a pair of horizontal shafts 25 driven by sprocket gearing 26 from a driven shaft 27 supposed to be mounted on the frame of the vehicle. The result is that the viscosity of the liquid is reduced by heat enough for the liquid to flow out through the delivery pipe 30, with the desired fluidity, to any suitable distributing device underneath. It will be understood that when the fire is not burning the liquid becomes very stiff; and that when the heat is applied the tubes 10, 18, become very hot, and consequently elongate considerably while the walls of the tank remain still cool. Owing to the movability of the combustion chamber, according to the expansion or contraction of the tubes, their variations of length apply no stresses to the tank joints, and no material stress to the joints between the tubes 10 or 18 and the tank head or internal header 12. As the valve 32 controlling this delivery is within the tank, controlled by stem 31 and wheel 33 above it, the liquid does not become frozen in the delivery pipe 30 when the fire is out. The proximity of the valve 32 to the heater tubes and the down drive of thinned liquid by the agitator 24, make the liquid in the region of the valve of the highest degree of fluidity and cause it to be melted early if any be solidified over night.

I claim as my invention:

1. Apparatus for thinning viscous liquid, comprising a tank for containing the liquid, combined with one or more oil combustion tubes open to atmosphere and extending horizontally within and along the bottom of the tank from an end thereof; a combustion chamber within the tank, into which the combustion tubes deliver; and one or more flues extending back from the combustion chamber to the same said end of the tank, for discharging there the products of combustion; the said tubes being fast to the tank only at its said end, and the said chamber being supported on the bottom of the tank, movable to and fro thereon with the expansion and contraction of the tubes, and fast only to said tubes.

2. Apparatus for thinning viscous liquid, comprising a tank for containing the liquid, combined with one or more oil combustion tubes open to atmosphere and extending horizontally within and along the bottom of the tank from an end thereof; a combustion chamber within the tank, into which the combustion tubes deliver; and one or more flues extending back from the combustion chamber to the same said end of the tank, for discharging there the products of combustion; the said tubes being arranged passing through and fast to a vertical end wall of the tank, passing through and fast to the nearer vertical wall of the said chamber, and delivering burning gases against the further upstanding wall thereof through openings having substantially the full diameter of the combustion tubes.

3. Apparatus for thinning viscous liquid, comprising a horizontal cylindrical tank for containing the liquid, combined with one or more oil combustion tubes open to atmosphere and extending horizontally within and along the bottom of the tank from an end thereof; a combustion chamber within the tank, into which the combustion tubes deliver; and one or more flues extending back from the combustion chamber to the same said end of the tank, for discharging there the products of combustion; the said tubes and flues being arranged within a segment below the middle of the cylinder and there being, on the outer face of said end wall, an enclosed passage adapted to receive the gases discharged from the flue tubes and guide them upward over said wall.

4. Apparatus for thinning viscous liquid, comprising a tank for containing the liquid, combined with a plurality of oil combustion tubes open to atmosphere and extending horizontally within and along the bottom of the tank from an end thereof; and a plurality of flue tubes connected therewith and extending back through the lower part of the said tank to the same said end of the tank, for there discharging the products of combustion; the said oil combustion tubes being provided with oil burners and each having a ratio of cross-sectional area to surface area larger than the ratio of cross-sectional area to surface area of the flue tubes; and the entire said passage for products of combustion, comprising said tubes and connections between them, being substantially free from diminution of the net cross section which it has at the place where combustion begins.

5. Apparatus for thinning viscous liquid, comprising a tank for containing the liquid, combined with one or more oil combustion tubes, having relatively large cross section and small surface area, open at atmosphere and extending horizontally within and along the bottom of the tank from an end thereof; and a plurality of flue tubes having relatively large surface area and small cross section, connected therewith and extending back to the same said end of the tank, for discharging there the products of combustion; the connection between the two sorts of tubes comprising a chamber wherein gases may be mixed and combustion of fuel be completed; said chamber being relatively narrow in the direction in which products of combustion enter it and having an upstanding wall, against which they impinge, whose remote side is in contact with the liquid which is to be thinned; and the combustion tubes being arranged to discharge their output against the said wall at substantially the lowest level of the combustion tubes and close to the bottom of the tank.

6. Apparatus for thinning viscous liquid, comprising a tank for containing the liquid, combined with an internal horizontal furnace comprising tubular fire chamber and returning flues attached to one vertical wall only of the tank, and free to move from and toward said wall by expansion and contraction; the said tank and furnace being of relatively long horizontal and short vertical dimension, occupying a minor part of the height of the tank, and the unattached end of the said furnace being supported on and movable over the bottom of the tank.

7. Apparatus for thinning viscous liquid, comprising a tank for containing the liquid, combined with one or more oil combustion tubes open to atmosphere and extending horizontally within and along the bottom of the tank from an end thereof; a plurality of flue tubes extending back to the same end of the tank; and a header, comprising a chamber through which the combustion and flue tubes are connected; the said tank having a bottom wall whose inner face is concave upward, and the header having a bottom wall whose outer face is convex downward with points of contact whereby these two approximately fit together and gravity tends to maintain them centered together, the whole being fast to said end portion of the tank and the header movable over the bottom wall by expansion and contraction of said tubes; the said tubes being contained in a segmental space at the bottom of the tank, and the space above the said segment being a container for the viscous liquid and free from said tubes.

Signed at Framingham, Massachusetts this twenty-fourth day of May 1924.

FRED W. CHIPMAN.